United States Patent

Andersen

[15] 3,668,670

[45] June 6, 1972

[54] METHODS AND MEANS FOR RECORDING AND READING MAGNETIC IMPRINTS

[72] Inventor: Robert D. Andersen, 1014 S. Hillborn, West Covina, Calif.

[22] Filed: Oct. 27, 1969

[21] Appl. No.: 869,500

[52] U.S. Cl. ...................340/174.1 F, 179/100.2 CH, 346/74
[51] Int. Cl. ..........................................................G11b 5/38
[58] Field of Search...................179/100.2 CH; 340/174.1 F, 340/174 M; 346/74

[56] References Cited

UNITED STATES PATENTS

| | | | |
|---|---|---|---|
| 3,114,009 | 12/1963 | Camras et al. | 179/100.2 CH |
| 3,163,721 | 12/1964 | Kuhrt et al. | 179/100.2 CH |
| 3,389,230 | 6/1968 | Hudson | 179/100.2 CH |
| 3,443,036 | 5/1969 | Maass | 179/100.2 CH |

*Primary Examiner*—Daryl W. Cook
*Assistant Examiner*—Joseph M. Thesz, Jr.
*Attorney*—Neinow & Frater

[57] ABSTRACT

A method of recording and then reading magnetic imprints in any of the several magnetizable areas of a magnetic storage surface by the steps of inducing magnetism in selected ones of those areas and then detecting the presence of a magnetic field at those areas by detecting in which of a number of Hall effect devices associated with those areas respectively the Hall effect is exhibited. Also disclosed are in-line and matrix magnetic readers employing Hall effect devices, and a unitary Hall effect reader and differential amplifier assembly, and a printer employing only a grid of conductors deposited on a substrate so that the conductors are in close proximity at the crossover points.

6 Claims, 13 Drawing Figures

FIG. 6

INVENTOR
ROBERT D. ANDERSEN
BY
ATTORNEYS

INVENTOR

ROBERT D. ANDERSEN

BY Hinrow & Frater

ATTORNEYS

METHODS AND MEANS FOR RECORDING AND READING MAGNETIC IMPRINTS

This invention relates to improvements in methods and means for recording and reading magnetic imprints and an object of the invention is to provide an improved method and improved means for recording and for reading such imprints.

It is possible to store digital information in a magnetizable medium by magnetizing or not magnetizing the medium and it is possible to magnetize the medium in variable degree whereby to store analog information. Only a very small amount of magnetic material is needed to store information whether in digital or analog form. Magnetic mediums such as oxide coated magnetic tape are capable of storing many thousands of bits of information per square inch of a thin film. The resolution with which information can be imprinted upon the magnetic tapes and other magnetic elements is good in one dimension even at very high information storage densities using any of a number of known imprinting techniques and devices. However, printing in two dimensions (i.e., on several lines simultaneously) with good resolution at high density is more difficult by several orders of magnitude. Moreover, reading high information density magnetic imprints has presented problems and an object of the invention is to provide a solution to the reading problem by providing improved means and apparatus for creating and reading very high density magnetic imprints.

While the invention is not limited to applications wherein the magnetic storage medium is a magnetic tape, the invention is particularly applicable to the imprinting and the reading of information stored magnetically on such thin and uniform surfaces as are found on magnetic tapes, discs and magnetic drums. The provision of an improved magnetic film and tape reader is another object of the invention.

The invention makes use of Hall effect elements. Electric charge carriers flowing from one point to another along a flow path will tend to be diverted to an alternative route along the flow path upon being intersected by a magnetic field at least a component of whose direction is normal to the direction of flow along the flow path. The fact that the flow path tends to be moved is designated the "Hall effect." It results in a change in the potential gradient in the element that forms the charge carrier flow path and changes in potential gradient can be detected and their magnitude measured.

An object of the invention is to employ the Hall effect in reading magnetic imprints. The Hall effect can be successfully exhibited and measured in a flow path of exceedingly small dimensions using even very low magnetic flux densities that are associated with magnetic imprints of very small size. It is an object of the invention to provide a magnetic imprint reader employing a plurality of very closely spaced Hall effect elements whereby it is possible to read high density magnetic imprints utilizing a separate Hall effect elements for each magnetic imprint area.

While the invention is applicable to a single Hall effect element capable of reading a single magnetic imprint, the fact that the individual Hall effect element may be very small in size makes the invention particularly useful in the form of readers employing a plurality of Hall effect elements arranged in a geometrical pattern corresponding to the pattern in which the magnetic imprinting is accomplished. Arranging a number of Hall effect elements in a line past which a tape or a drum may be moved relatively, permits sequential reading of large quantities of imprinted information from any of a number of tapes, drums, or other similar storage elements. Provision of structure of this general kind is one of the objects of the invention.

Arranging Hall effect elements along a single line is accomplished with relative ease in practice because the problems that attend high density occur in only one direction. In most instances there is ample room at the side of that line for completing the necessary electrical connection to the Hall elements which comprise the line. But another object of the invention is to provide a printer capable of reading magnetic imprints that extend over an area rather than along a single line. The Hall elements employed in the invention can be made sufficiently small, and the number of electrical connections and electrical leads required to enable orderly reading of the imprints is limited sufficiently, to make it practical to read magnetic imprints by area as well as by line.

Area reading involves the problem of accurate registration of imprint and reader and one of the objects of the invention is to provide a structure in which a relative position of imprinter, a storage element, and reader are fixed. This is possible because the Hall effect varies with flux density rather than rate of change of flux. Whether the reader be a line or an area device, one advantage of the invention is that it employs semiconductor materials which are fabricated, deposited, etched and otherwise processed using the same techniques as are employed in making integrated and printed circuits so that they can be produced as an integral part of larger circuits. The provision of this advantage is another object of the invention.

Certain of these and other objects and advantages of the invention which will hereinafter appear are realized by the provision of the method of recording and reading magnetic imprints in the several magnetizable areas of a magnetic storage surface which comprises the steps of selectively inducing magnetism in the several magnetizable areas of a magnetic storage surface such that a magnetic field is established adjacent selected areas of that surface, and by detecting the presence of the magnetic field at said selected areas of the surface by detecting in which of a plurality of Hall effect elements disposed adjacent the several magnetizable areas of said surface the effect is exhibited. Moreover, certain objects and advantages of the invention are realized by the provision of an imprint reader comprising a plurality of Hall effect elements each including a flow path for charge carriers in one direction and means for detecting changes in charge distribution along said flow path as an incident to magnetic displacement of the flow path, the Hall effect elements being arranged to define a geometric pattern capable of being complemented by a pattern imprinted in a magnetizable material.

Figure 1:
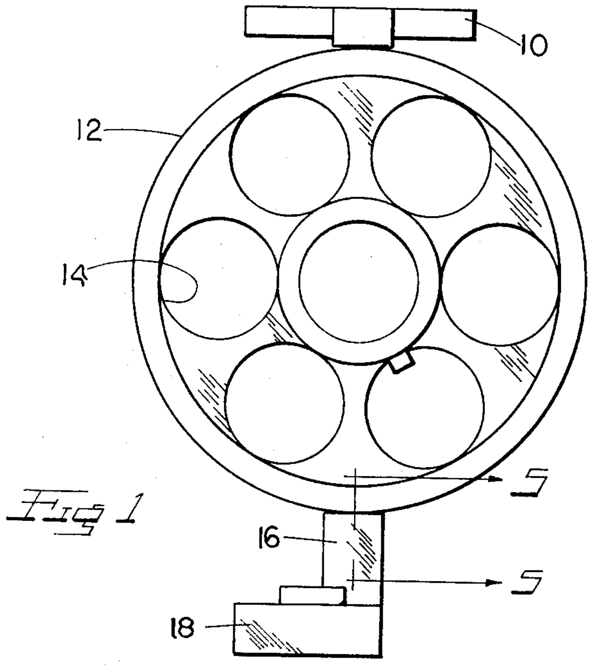
FIG. 1 is a view in end elevation of an apparatus embodying the invention and which includes a magnetic storage drum in association with a magnetic printer and a magnetic reader.

In FIG. 1 the reference numeral 10 designates a magnetic printing unit capable of magnetizing discrete areas of the surface along one line extending substantially throughout the length of the surface 12 of the magnetic drum unit 14 which is shown in end view. Diametrically of the printer 10 a magnetic read or reading unit 16 is placed adjacent the magnetic surface 12. The reading unit extends the length of the drum and is capable of reading the magnetic imprints along a line that extends substantially the length of the drum. A structure, not shown in FIG. 1, is provided for turning the drum 14 so that the magnetic imprints impressed by the recording head 10 can be rotated to the line opposite the magnetic imprint reader 16. The printer is capable of magnetizing tiny, discrete areas of the surface 12 and the magnetic reader incorporates a number of discrete reading elements each one of which is placed so that it lies opposite an area of the surface 12 which is capable of being magnetically imprinted by a respectively associated section of the printing head. A switching unit 18 associated with the reader determines the order in which the several reading elements of the reader 16 are examined during the reading process.

Figure 2:
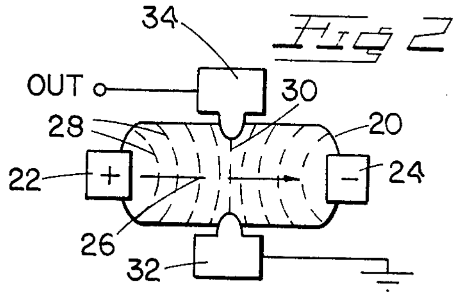
FIGS. 2 and 3 are schematic representations of Hall effect elements in which the effect on potential gradient of the imposition of magnetic flux is shown diagrammatically.

The discrete reading elements employed in the invention comprise Hall effect devices. If electrical charge carriers are made to flow along a flow path from one point to another they will follow that route through the path which presents the least resistance. Not all carriers will follow the same route partly because of the atomic and molecular structure of the flow path and partly because like charges tend to repel one another. Convention permits drawing an arrow to define the direction of the mean route along the pathway. However, the direction of charge flow along the flow path is more accurately defined by a map of the electrical field between terminal points on the flow path utilizing lines of equal potential. Both the conventional arrow and the field map have been drawn to describe the direction of charge flow through the Hall effect element 20 in FIG. 2. That element forms a flow path for electrical charge carriers from a positive terminal point 22 to a negative terminal point 24. The unit shown in FIG. 2 is symmetrical and the arrow 26 has been drawn to show that the mean route for charges through the element extends directly down its center from the positive to the negative terminal. The equal potential lines, representative ones of which are designated by the reference numeral 28, form a symmetrical pattern around the positive and negative terminals. The mid-voltage line 30 extends directly across the element 20 perpendicular to the direction of arrow 26. In the mid-region between its end terminals 22 and 24, the Hall effect element is provided with a pair of output terminals 32 and 34. These output terminals are arranged one on each side of the flow path for the charge carriers. Advantageously, as shown, they make contact with the Hall effect element at points of equal potential.

Figure 3:
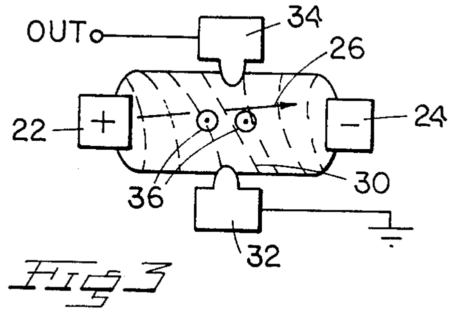

FIG. 2 represents the situation in the absence of magnetic influence. When the Hall effect element, and the charge carriers flowing between its terminals 22 and 24, are subjected to, or are "linked by," lines of magnetic flux which "cut" the path of the charge carriers perpendicularly, (or have a component of direction which is perpendicular to that direction of flow) then a force is exerted upon the charge carriers which deflect them from the mean route followed in the absence of those flux lines. The mean charge carrier is redirected to a different route along the pathway as it proceeds from terminal 22 to 24 as shown in FIG. 3. Because of the presence of the flux lines 36, the mean route 26 has been shifted to one side of the center line of the unit. The shifting of the mean line 26 indicates that the distribution of charges in the Hall effect element is no longer symmetrical. Further, the electrical field is no longer uniform and this is evidenced in FIG. 3 by a distortion of the line of equal potential. In particular the equal potential line 30, which represents the mid-potential between the potentials of terminals 22 and 24, lies to the left of output terminal 34 and lies to the right of output terminal 32. Terminals 32 and 34, which in FIG. 2 are shown to have the same potential, have different potentials in FIG. 3 as an incident to the Hall effect element being subjected to the flux lines 36. The fact of this potential difference can be detected to provide a digital signal and its magnitude can be measured to provide an analog signal. This phenomenon is known as the "Hall effect" and it is employed in the invention to determine whether or not a given area of a magnetizable element has been or has not been magnetized.

The magnitude of the observed effect becomes greater as the voltage differential across the Hall effect element is increased provided that there is an ample flow of charge carriers. These requirements are met in semi-conductor materials. Only the majority carrier mechanism is important. Because of this Hall effect devices can be depended upon to be stable, reliable, and reproducable. Selection of a semi-conductor material depends primarily upon resistance, temperature response and magneto resistive characteristics. Indium antimonide, indium arsnide and germanium may be used successfully. Indium arsnide has relatively low resistance and good temperature characteristics. It represents the best compromise for many applications. The Hall effect device may be formed as a film of the semi-conductor material deposited upon a high resistance substrate or it may be formed as a wafer of bulk material.

Four electrical connections must be completed to each Hall effect element. Two of these, corresponding to terminals 22 and 24 in FIGS. 2 and 3, form the points of voltage application which establishes flow of majority carriers through the semi-conductor body of the device. Two additional electrical connections are completed to the semi-conductor body so that they lie opposite one another across the flow path to the semi-conductor body. The terminals 32 and 34 in FIGS. 2 and 3 are examples. The dimensions of the area over which the output contact connection is accomplished are important and are advantageously small. The width of the contact area in the direction of the flow path is particularly critical because if it is too wide it will short circuit an otherwise detectable potential gradient.

Figure 4:
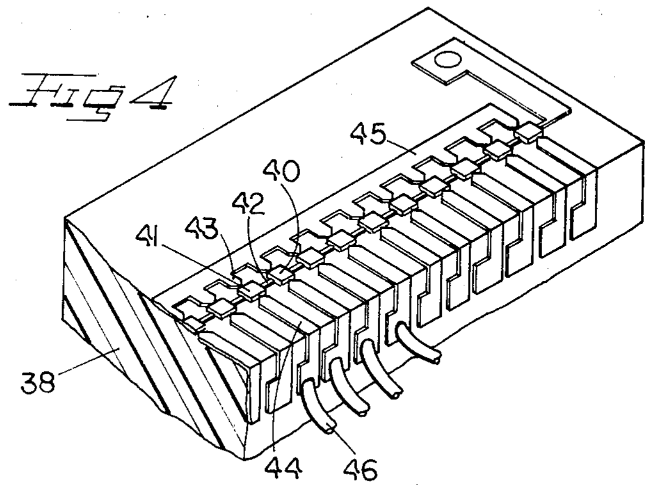
FIG. 4 is an isometric view of a fragment of an in-line magnetic reader embodying the invention.

The Hall effect is sufficiently pronounced so that it is feasible to employ Hall effect elements which are very small small in size. The minimum size limitation is imposed not by the magnitude of the Hall effect but is currently imposed instead by lack of techniques for positioning and making electrical connections to large numbers of semi-conductor wafers and by the difficulty in completing wire connections to large numbers of such devices when their density is high. However, these limitations are less severe in the Hall effect structures provided by the invention than are those which limit the size of previously available structures for reading magnetic impressions. Thus, the invention provides a reliable method and means by which very high density magnetic impressions may be read. This result stems in part from the fact that it is not material to their function whether a plurality of Hall effect elements are connected to a power source with their flow paths in series or in parallel. Further, one of the output terminals of the device may be connected to a common circuit or ground. Thus, the electrical circuitry is less difficult to arrange physically than the requirement for four connections to each Hall effect element would suggest. An example of a physical arrangement in which a series of Hall effect elements are arranged in a line is shown in FIG. 4. In that figure electrical circuit runs have been deposited upon a substrate 38. Wafers of semi-conductor material have been bonded to those circuit runs so that they are arranged in a straight line on the upper surface of the substrate. In this embodiment the semi-conductor material is indium antimonide and the several wafers of that material have an upper surface area whose dimensions are approximately two-thousandths of an inch on a side. The spacing between successive wafers is also approximately two-thousandths of an inch. Wafers 40 and 41 are representative. They are connected in series with one another and with all of the other wafers of a line by circuit runs. These circuit runs are slightly longer than the spacing between successive wafers. By way of example, the run that extends between and which interconnects wafers 40 and 41 is designated by the reference numeral 42. Thus, the run 42 serves as the input terminal of the charge flow path of one wafer and it serves as the output terminal of the charge flow path of the other wafer. The two output terminals of wafer 41 are designated 43 and 44, respectively. Output terminal 43 connects with a common run 45 so that terminal 43 corresponds to terminal 32 in FIGS. 2 and 3. Terminal 44 of FIG. 4 corresponds to output terminal 34 in FIGS. 2 and 3. It forms a circuit run which terminates at a point below the plane of the wafers where a wire connection 46 is bonded to it. Only a few of the wire connections are shown to avoid making the drawing unduly complex.

Figure 5:
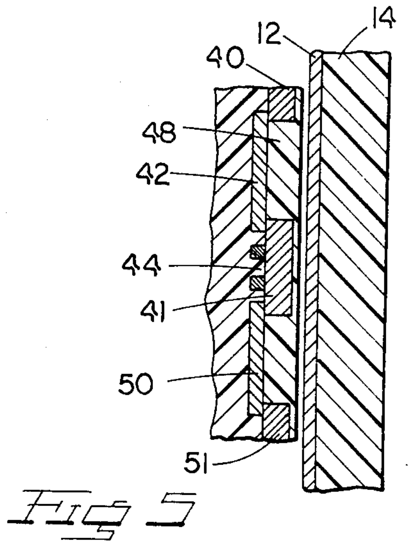
FIG. 5 is a cross-sectional view taken on line 5—5 of portions of the magnetic reader and magnetic storage element of FIG. 1.

The assembly of FIG. 4 is incapsulated for protection and then is molded into the larger housing which is called the printer 16 in connection with FIG. 1. FIG. 5 shows the incapsulation material 48 and the fact that it forms only a thin film over the upper surface of the semi-conductor wafers whereby the wafers may be brought in close proximity to the magnetic surface 12 of the drum 14. In FIG. 5 the two wafers 40 and 41 are shown to be bonded one to each end of the circuit run 42 which connects them in series. The circuit run 50 extends between the wafer 41 and another wafer 51. The cross-sectional view of FIG. 5 is taken in a plane such that the end of circuit run 44 is visible.

Examination of FIGS. 1, 4 and 5 will show that the drum printing and reading system of FIG. 1 is arranged so that magnetic impressions centered four-thousandths of an inch apart along a line extending the length of the drum can be detected individually. Moreover, since the line on which the sensing elements extend is only two-thousandths of an inch wide a very large number of magnetic impressions may be stored around the circumference of the associated drum.

Figure 6:
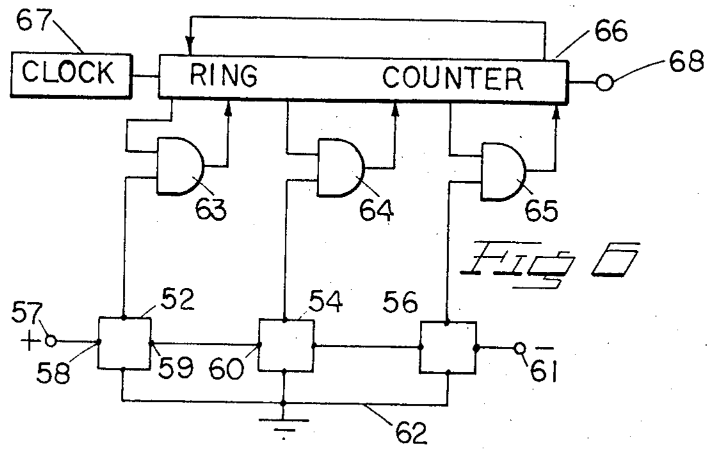
FIG. 6 is a schematic diagram of some of the electrical circuitry employed in the magnetic reader.

FIG. 6 illustrates one way in which the magnetic printer can be arranged so that the information imprinted in the several areas of the storage element can be determined and identified. The simplified circuit of FIG. 6 includes only three Hall effect elements 52, 54 and 56. They are connected in series between a positive terminal and a negative terminal to which an external source of power is connected to the end that charge carriers are made to flow in series through the three Hall effect elements. That circuit is traced from the positive terminal 57 to the input terminal 58 along the flow path to Hall effect element 52 to the output flow path terminal 59 to the input terminal flow path 60 of the element 54 and so on to the negative terminal 61. Each Hall effect element has a pair of output terminals one of which is connected to the common ground line 62. Gates 63, 64 and 65 are associated with Hall effect elements 52, 54 and 56, respectively. These gates are interconnected by a ring counter 66 which is operated and controlled by a clock 67. The other output terminals of the three Hall effect elements are connected to one of the input lines of their respectively associated gates. Another input line from each gate is connected to the ring counter. The clock 67 sends signals to the ring counter 66. The ring counter sends a signal to the several gates in turn so that the gates are opened in succession. If any signal appears at the output terminals of the Hall effect elements a corresponding signal will appear at the ring counter output terminal 68 during that interval when the ring counter opens the respectively associated gate.

Figures 7, 8, 9, 10, 11, 12, 13:
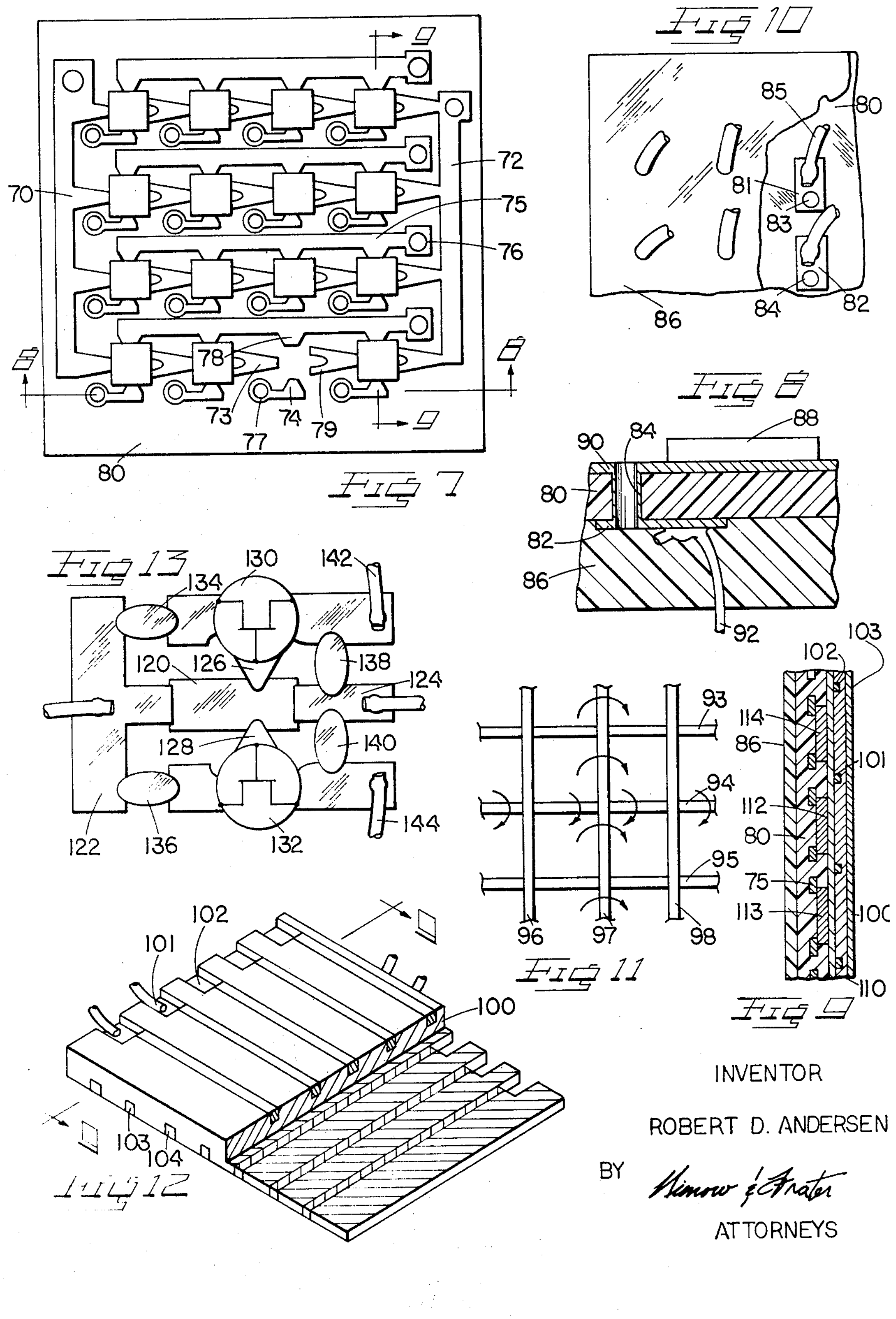
FIG. 7 is a top plan view of a magnetic reader of the area type which embodies the invention and from which one of the Hall effect elements has been omitted to make the structure below visible.
FIG. 8 is a fragmented, cross-sectional view taken on line 8—8 of FIG. 7.
FIG. 9 is a cross-sectional view of a composite magnetic printer, storage element, and reading unit embodying the invention and taken on lines 9—9 which extend through the apparatus depicted in FIGS. 7 and 12.
FIG. 10 is a fragmentary view of the reverse side of the unit of FIG. 7 from which a portion has been broken away to show the interior construction.
FIG. 11 is a diagram illustrating operation of one form of magnetic printer.
FIG. 12 is an isometric view of a magnetic printing unit employed in the invention and a portion of which has been broken away.
FIG. 13 is a partially diagrammatic top plan view of a differential amplifier employing a Hall element which is useful in the construction of magnetic imprint readers and which embodies the invention.

The simplicity of the circuit arrangement possible with Hall elements arranged in a line or row is evident in FIG. 4. But, the advantage of using the Hall element is not limited to row arrangements. This is illustrated in FIG. 7 which shows a matrix of Hall elements arranged in rows and columns. While only a four element by four element matrix is shown, it will be evident that the problem of circuit layout and interconnection is not proportionally greater in a matrix of any size. Despite the fact that the completed matrix includes 16 Hall effect elements each of which has four terminals, as few as 22 external connections are required to determine completely which Hall effect elements are subjected to magnetic flux and which are not or to determine the quantity of flux to which each of them is subjected. In FIG. 7 the four Hall effect elements of each horizontal row are connected in series and the several rows are connected in parallel between an input circuit run 70 of the input power or majority carrier flow path circuit and the output circuit run 72 of that circuit. Whether run 70 or 72 be connected to the positive side of the source is determined by the character of the semi-conductor material that forms the Hall effect element body. It is important that the majority carriers flow from circuit run 70 to circuit run 72 because the electrical connection to the carrier flow path through the several semi-conductor wafers has been optimized in this printer to the end that the Hall effect is multiplied. To facilitate understanding of how this is done the semi-conductor wafer second from the right in the bottom row of FIG. 7 has been omitted whereby the circuit runs that connect to that element are visible. The output terminals are designated 78 and 74. Terminal 78 is connected to a run 75 which is common to the lower row and terminates at the right in a connection 76 which extends through the substrate to its opposite side. Output terminal 74 is also connected through to the opposite side of the substrate by a connection 77. The two output terminals 78 and 74 are arranged on opposite sides of the flow path that will be established through the semi-conductor wafer by the input terminal 73 of the input power circuit and the output terminal 79 of that circuit. Terminal 73 is very narrow at the point at which it will be connected to the semi-conductor wafer and it is arranged so that it will be centered on one side of that wafer. The output terminal 79 is bifurcated so that in effect there will be two points of connection at the opposite side of the semi-conductor wafer. The effect of this construction is that the majority carriers follow two mean routes through the wafer to the end that a greater change is experienced in the electrical field map of the Hall effect element. A greater potential difference appears across the output terminals for a given amount of magnetic flux. Other terminal configurations also serve to multiply the magnitude of the Hall effect. However, the configuration shown in FIG. 7 is very easily achieved and is advantageously employed.

It is necessary that the Hall effect elements be placed in close proximity to the magnetic imprint to be read to achieve maximum effect. In most instances, it will be desirable to arrange the Hall effect elements so that their placement relative to one another defines a known geometric pattern. In addition it is advantageous that they be arranged so that their individual exposed surfaces combine to define a uniform matrix surface permitting all of the units of the matrix to be brought in close proximity with a flat or curved sheet material. This requirement is not essential for all applications but it is required if the magnetic imprints occur on a flat tape or on a curved drum surface. Imposition of this requirement means that electrical leads cannot be brought out from the unit on the side toward the exposed surfaces of the Hall effect devices. In this embodiment most of the circuit runs are positioned on a plane parallel to but slightly removed from the plane of the elements. Others of the circuit runs and connections are placed on the opposite side of the substrate on which the matrix is formed. Some means must be provided for completing electrical connection from one side of the substrate to the other and this is conveniently accomplished using existing techniques, such for example as laser drilling, to form very small diameter holes through the substrate which can be plated through to circuit runs on the opposite side. The reader of FIG. 7 is an example of construction employing those techniques.

The reverse side of the substrate 80 on which the matrix is formed is illustrated in FIG. 10. The holes through the substrate open at conductive pads formed on the opposite side of the substrate. Two such pads 81 and 82 are shown in FIG. 10. These pads are connected with the circuit runs on the opposite side of the substrate by plating which extends through the holes 83 and 94. The circuit is completed by wires, such as the wire 85, which are bonded to the pads. After the wires have been attached they and the pads are incapsulated in a potting compound which overlies the substrate and is designated by the reference numeral 86. The construction is shown in cross-section in FIG. 8. In this figure the numeral 88 designates a wafer of semi-conductor, Hall effect material to which is bonded an output circuit run 90. The opening 84 of FIG. 10 opens at that run 90 and is plated in the manner illustrated in FIG. 8. The plating through the hole is connected to the circuit pad 82 which lies against the underface of the substrate 80. A wire 92 is bonded to the pad 82 and the pad and the wire are incapsulated in the layer of potting compound 86. It will be apparent from examination of FIG. 7 that this construction provides an active area for the reading function of approximately one-fourth of the matrix area. A variety of circuit forming techniques are currently being practiced which permit substantially higher density of active elements.

The matrix of FIG. 7 is capable of determining whether there is or is not a magnetic imprint on the tape which overlies the matrix. If the matrix and tape are movable relative to one another then the matrix can be used to determine the pattern of magnetic imprints, and the magnitude of the various magnetic imprints, throughout the length of the tape. In other applications it will be sufficient to employ the magnetic reader to determine whether there is or is not a magnetic imprint in a magnetic structure or sheet of magnetic material which overlies the matrix and is not movable relative to the matrix. Such a structure might be employed in connection with a printer arranged to overlie the opposite face of the magnetic material and which is fixed relative to the magnetic material and the magnetic reader such that a sandwich construction is formed. The printer is arranged to overlie one side of the sheet of magnetizable material against whose opposite side the printer was placed.

Printing can be accomplished with any of a variety of structures. One convenient and simple structure is illustrated in FIG. 11. It comprises a grid of conductors. Some of the conductors are spaced and extend in a direction to form a series of rows and the other conductors are spaced and extend in a direction to form a series of columns. The rows are insulated from the columns but are arranged in parallel planes which are sufficiently close to one another so that there is interaction between the magnetic fields that surround the conductors when current is made to flow through them. A magnetic field encompasses every electrical conductor through which current is made to flow. The direction of that field is defined by the familiar "Right-hand Rule." If current is made to flow through one of the rows and through one of the columns the magnetic field surrounding the two conductors will aid one another in two quadrants around the intersection of that row and column. They will oppose one another in the other quadrants around the intersection. This is illustrated in FIG. 11 where the numerals 93, 94, and 95 designate row conductors and the numerals 96, 97, and 98 designate column conductors. If it is assumed that an electric current is made to flow through conductors 94 and 97 in a direction to produce the magnetic field direction suggested by the arrows associated with these conductors, then the fields will cancel in the space between conductors 93 and 94 which is bounded by conductors 97 and 98. Also the field will cancel in the space bounded by conductors 94 and 95 and by conductors 96 and 97. The fields will add in the other two quadrants that surround the intersection of conductors 94 and 97. In the space bounded by conductors 93, 94, 96, and 97 they add to create a flux whose direction is outward from the page. They add to create a flux whose direction is toward the page in the area bounded by conductors 94, 95, 97, and 98. Hall effect elements disposed adjacent the spaces where the flux lines cancel will not but Hall effect elements disposed in the other two spaces will experience the Hall effect. That is, a Hall effect element disposed in the space or adjacent to the space bounded by conductors 93, 94, 96, and 97 will experience the Hall effect to provide an output signal of one polarity. The Hall effect element disposed in or adjacent to the space bounded by conductors 94, 95, 97, and 98 will experience the Hall effect in that a voltage will be developed which has an opposite polarity. Thus, two elements exhibit the Hall effect as an incident to energizing the conductor wires at single junction in the printer. This phenomenon has the effect of diminishing the information per unit area capacity of a magnetic printer and reader combination. A whole body of knowledge is available for treating this problem which is common to other magnetic printers and a number of techniques are available to ameliorate this result. Among them are the employment of polarity sensitive circuitry and the incorporation of erasing signals into the printing language.

A printing head is shown in FIG. 12 where it is seen to comprise a slab of substrate material 100 etched at one side to form spaced depressions in rows such as the rows 101 and 102. It is etched at the opposite side to form columns such as the columns 103 and 104. Conductors are deposited in those etched depressions to form a grid of conductors in the substrate 100 which is then placed against the sheet of magnetizable material. The printer and the reader are placed on opposite sides of the magnetizable element so that the Hall effect elements of the reader are disposed opposite the spaces between the conductors of the printing grid. This arrangement is illustrated in FIG. 9. In that figure the printing head is at the right of the sheet of plate 110 of magnetizable material and the magnetic reader is at the left. The Hall effect elements of the latter are designated by the reference numerals 111, 112 and 113. In this embodiment the magnetizable material is shown as a continuous sheet. It can also be described as a layer of material overlying one side of the printer and comprising a magnetizable material disposed at points overlying the spaces between the conductors of the printer grid at points adjacent the cross-over point. This definition envisions an arrangement in which separate magnetizable areas are associated with only one cross-over of the grid. Other applications, involving other computer language use, do not require separation of the magnetizable areas.

The number of charge carriers in a semi-conductor material varies with temperature and other variables. This factor must be taken into account in creating an analog reader in which the degree of magnetization of a magnetic imprint is to be determined by a Hall effect element. While some of the output variations they occasion can be minimized by direct compensation, Hall effect elements lend themselves to incorporation in differential amplifiers so some errors be nullified by this means. FIG. 13 illustrates how two amplifiers employing field effect transistors can be combined with a Hall effect element to provide a differential amplifier. The body of Hall effect semi-conductor material is designated by the reference numeral 120. The flow of carriers through this material proceeds from the negative terminal or circuit run 122 to the positive terminal or circuit run 124. The output terminals 126 and 128 are connected to the base electrode of field effect transistors 130 and 132, respectively. Corresponding input terminals of the two transistors are connected to the circuit run 122 through resistors 134, in the case of transistor 130, and 136, in the case of transistor 132. The output terminal of the two transistors are connected to the circuit run 124 through resistors 138 and 140, respectively. The output of transistor 130 is measured across resistor 138 at an output terminal 142. The output of transistor 134 is measured across resistor 140 at an output terminal 144. It will be recognized that this circuit arrangement can be connected to a circuit which measures the difference of output at terminals 142 and 144 so that the circuit of FIG. 13 comprises a differential amplifier.

Although certain specific embodiments of the invention and shown and described, many modifications thereof are possible. The invention, therefore, is not to be restricted except insofar as is necessitated by the prior art and by the spirit of the appended claims.

I claim:

1. A magnetic imprint reader comprising:

a plurality of individual, discreet Hall effect elements arranged in rows and columns and lying flat in a common plane and each including a flowpath for charge carriers in one direction and a pair of output terminals at opposite sides of said flowpath;

a conductor extending between adjacent sides of successive pairs of the elements of a row whereby the elements of the row are connected in series;

means for subjecting said Hall effect elements to magnetic flux, said means comprising a memory element having selectively magnetizable surface areas and means for positioning said element such that its magnetizable surface areas overlie respectively associated ones of said Hall effect elements; and means for detecting voltage changes at each pair of output terminals comprising circuit runs each run associated with one of said rows and having an electrical connection to the corresponding side of each of the Hall effect element of the row, and means associated with each Hall effect element for making electrical connection thereto at the side opposite said circuit run including means for conducting currents therefrom to a point removed from said common plane.

2. The invention defined in claim 1, which further comprises means for magnetically imprinting said memory element including means for magnetizing the surface areas of said memory element overlying respectively associated ones of said Hall effect elements.

3. A magnetic imprint reader comprising:

a plurality of individual discreet Hall effect elements each including a flowpath for charge carriers in one direction and a pair of output terminals at opposite side of said flowpath, said Hall effect elements being arranged in a row;

a plurality of conductors each extending between the adjacent sides of a respectively associated pair of successively arranged elements whereby the elements of the row are connected in series by said plurality of conductors;

means for detecting voltage changes at the pairs of output terminals including a circuit run extending alongside the row of Hall effect elements and having connection to a corresponding side of each of them and a plurality of conductors, one or each Hall effect element of the row, connected to one of said Hall effect elements;

means for subjecting said Hall effect elements to magnetic flux, said means comprising a memory element having selectively magnetizable surface areas and means for positioning said element such that its magnetizable surface areas overlie respectively associated ones of said Hall effect elements; and means for magnetically imprinting said memory element including means for magnetizing the surface areas of said memory element overlying respectively associated ones of said Hall effect elements;

said memory element being disposed between said means for magnetically imprinting said imprint reader and further comprising means for precluding relative motion between said means for magnetically imprinting said memory element.

4. A magnetic imprint reader comprising:

a plurality of individual discreet Hall effect elements each including a flowpath for charge carriers in one direction comprising a body of semi-conductor material and a pair of output terminals at opposite sides of said flowpath, said Hall effect elements being arranged in a row; and means for detecting voltage changes at the pairs of output terminals including a circuit run extending alongside the row and having electrical connection to each Hall effect element of the row and a plurality of conductors, one associated with each of said Hall effect elements and each having electrical connection to the other side of its respectively associated Hall effect element;

a plurality of conductors each interconnecting a respectively associated pair of successively arranged Hall effect elements whereby said elements are connected in series;

each of said conductors having a single connection to one, and two spaced connections to the other, of the two Hall effect elements it innerconnects.

5. The invention defined in claim 4, in which said three spaced terminals and said output terminals lie substantially in a common plane.

6. The invention defined in claim 5, in which said flow path for charge carriers extends from the third one of said three terminals in each of said Hall effect elements.

* * * * *